United States Patent
Hayakawa (10) Patent No.: US 6,603,495 B2
(45) Date of Patent: Aug. 5, 2003

(54) IMAGE FORMING APPARATUS HAVING IMPROVED POSITION ABERRATION DETECTION

(75) Inventor: Masahiro Hayakawa, Shizuoka (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 09/901,729

(22) Filed: Jul. 11, 2001

(65) Prior Publication Data

US 2002/0054200 A1 May 9, 2002

(30) Foreign Application Priority Data

Jul. 13, 2000 (JP) ........................... 2000-212830

(51) Int. Cl.[7] .................. B41J 2/385; G01D 15/06; G03G 15/00; G03G 15/01
(52) U.S. Cl. ................ 347/116; 399/49; 399/72; 399/301
(58) Field of Search .................... 347/116, 115; 399/301, 299, 49, 72

(56) References Cited

U.S. PATENT DOCUMENTS

| | | | |
|---|---|---|---|
| 5,374,950 A | * 12/1994 | Yasuda et al. | |
| 5,384,592 A | * 1/1995 | Wong | 347/116 |
| 5,933,680 A | * 8/1999 | Nishimura | 399/49 |
| 5,946,537 A | * 8/1999 | Nakayasu et al. | 399/301 |
| 6,198,896 B1 | * 3/2001 | Nakayasu et al. | 399/301 |
| 6,282,396 B1 | * 8/2001 | Iwata et al. | 399/301 |
| 6,295,435 B1 | * 9/2001 | Shinohara et al. | 399/301 |
| 6,300,968 B1 | * 10/2001 | Kerxhalli et al. | 347/116 |
| 6,317,147 B1 | * 11/2001 | Tanaka | 347/116 |

* cited by examiner

*Primary Examiner*—Susan S. Y. Lee
(74) *Attorney, Agent, or Firm*—Fitzpatrick, Cella, Harper & Scinto (57) ABSTRACT

To reduce errors in a detection of pattern images to enable aberrations to be detected accurately. An image forming apparatus includes a plurality of image forming units for forming images of different colors, a moving member moving so as to transfer the images formed by the plurality of image forming units to corresponding transfer locations, a pattern forming unit for controlling the plurality of image forming units so as to form a plurality of pattern images in a direction crossing a movement direction of the moving member so that two pattern images of a predetermined reference color are transferred onto the moving member with one pattern image of a different color transferred therebetween, a pattern detecting unit for detecting the pattern images transferred onto the moving member, and a correction unit for detecting aberration of the image of the different color with respect to the images of the reference color on the basis of an output from the pattern detecting unit and for correcting the aberration of the image of the difference color on the basis of the detected aberration.

20 Claims, 7 Drawing Sheets

IMAGE FORMING APPARATUS HAVING IMPROVED POSITION ABERRATION DETECTION

BACKGROUND OF THE INVENTION

1. Field of the Invention

The present invention relates to an image forming apparatus, and in particular, to correction of aberration of an image position.

2. Related Background Art

For color image forming apparatuses, various systems have been proposed which have a plurality of image forming parts in order to increase processing speed and which sequentially transfer images of different colors onto a recording material held on a conveying belt.

Problems with such apparatuses having the plurality of image forming parts include color aberration (one of position aberration) in which when the color images are placed on one another, the color images are not overlapped at a common position due to an irregular movement of a plurality of photosensitive drums or the conveying belt associated with mechanical accuracy or the like or due to the variation, for each color, of a relationship between an outer peripheral surface of the photosensitive drum and the movement of the conveying belt in the transfer positions of the image forming parts.

In particular, in apparatuses including a plurality of image forming parts each having a laser scanner and a photosensitive drum, there are errors in the distance between the laser scanner and the photosensitive drum between the image forming parts. If these errors are different among the image forming parts, the laser scanning width on the photosensitive drum varies, resulting in color aberration.

Figure 2A:
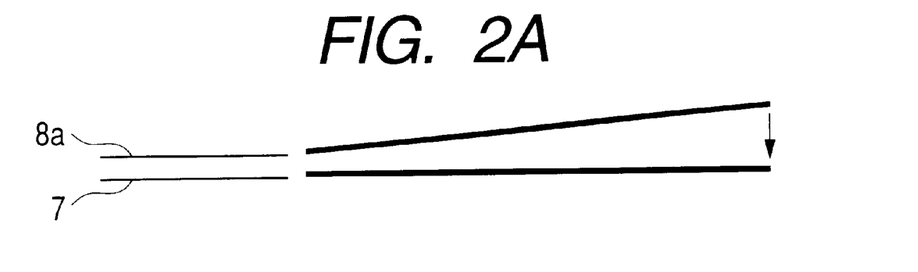
FIGS. 2A, 2B, 2C and 2D are views showing aberration of images.
Figure 2B:
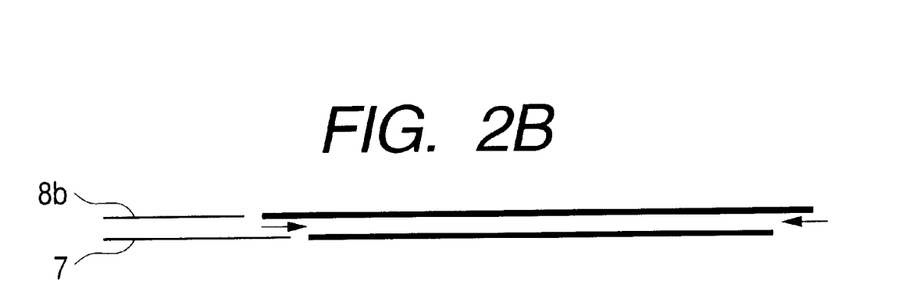
Figure 2C:
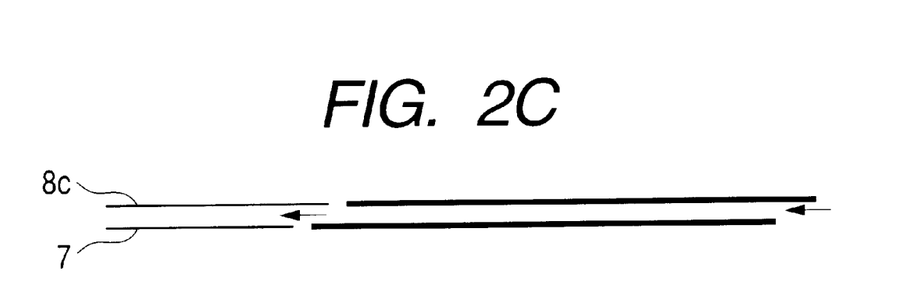

FIGS. 2A, 2B, 2C and 2D show an example of a color aberration. Reference numeral 7 denotes an original image position, and reference numeral 8 (8a–8d) denotes an image position observed when the color aberration occurs. Additionally, FIGS. 2A, 2B and 2C show cases in which the color aberration occurs in a scanning direction. In those figures the two lines are separately drawn in a conveying direction for easy understanding.

FIG. 2A indicates an inclination of a scanning line which occurs when an optical part and the photosensitive drum are inclined relative to each other. This inclination can be corrected to the arrowed direction by, for example, adjusting the position of the optical part, the photosensitive drum, or a lens.

FIG. 2B indicates a scale aberration caused by variations in the distance between the optical part and the photosensitive drum. The case is likely to occur when the optical part comprises laser scanner. This aberration can be corrected to the arrowed direction by, for example, fine-tuning image frequency (increasing the frequency if the scanning width is large) to change the length of the scanning line.

FIG. 2C indicates a write start position error in the main-scanning direction. This error can be corrected to the arrowed direction by, for example, adjusting a write start timing with respect to a beam detected location if the optical part comprises a laser scanner.

Figure 2D:
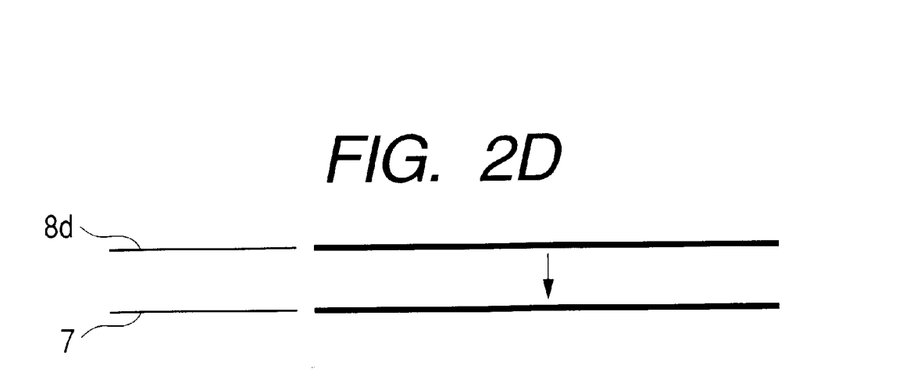

FIG. 2D indicates a sub-scanning direction (sheet conveying direction) aberration. This can be corrected to the arrowed direction by the arrow by, for example, adjusting the write start timing with respect to detection of a leading end of a sheet for each color.

To correct these color aberrations, position aberration detecting patterns for corresponding colors are conventionally formed on the conveying belt and are detected by a pair of optical sensors provided on the respective sides of a downstream part of the conveying belt so that various adjustments as described above are carried out depending on the amount of aberration detected.

Figure 3:
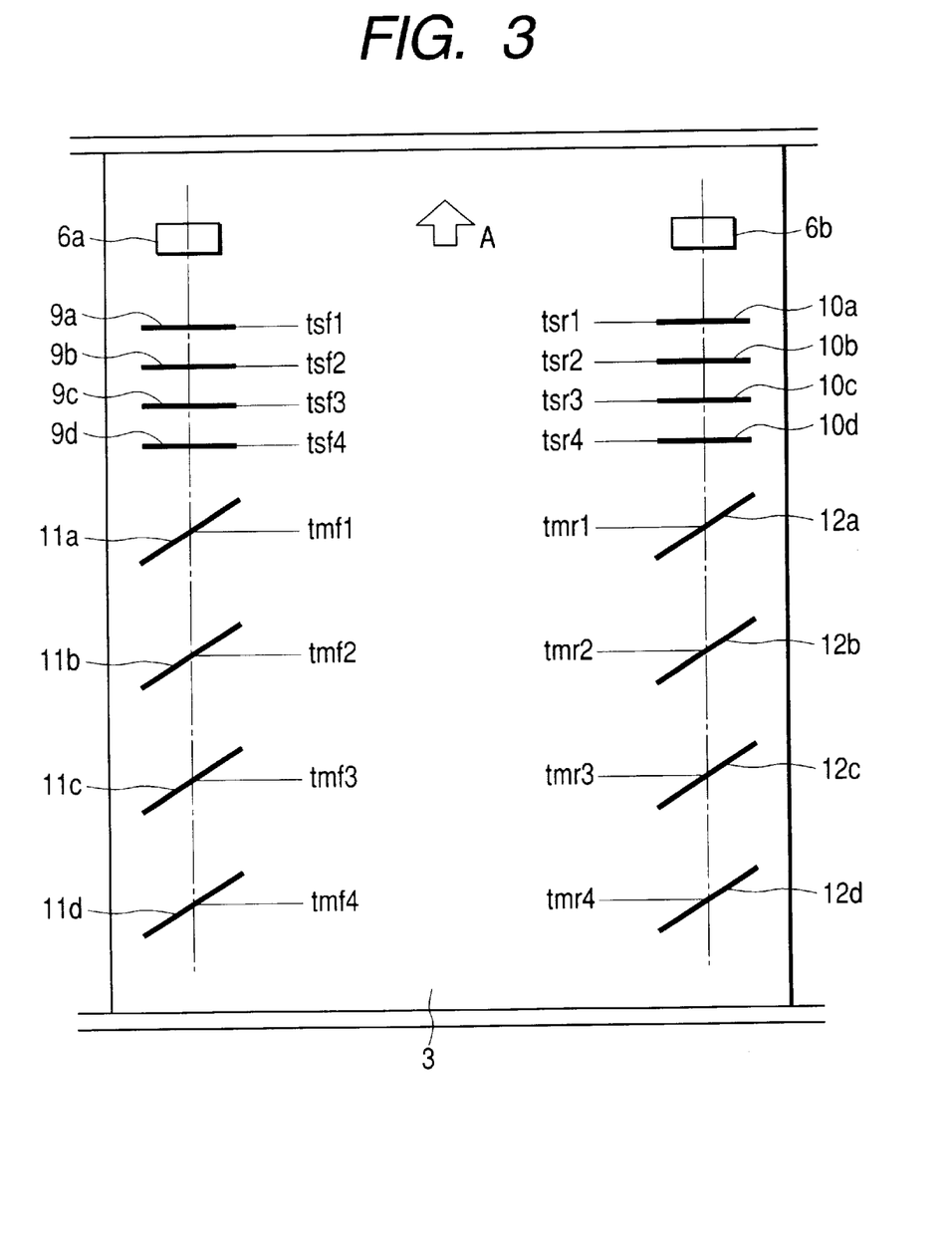
FIG. 3 is a view showing conventional aberration detecting patterns.

FIG. 3 shows an example of such position aberration detecting patterns. Reference numerals 9 and 10 denote patterns for detecting position aberration in the sub-scanning direction. Reference numerals 11 and 12 denote patterns for detecting position aberration in the scanning direction, which are inclined from a conveying direction of belt 3 through 45° in FIG. 3. The patterns 9 to 11 have been transferred onto the conveying belt.

Reference numerals 9a, 10a, 11a, and 12a denote black patterns (hereafter referred to as "Bk"), reference numerals 9b, 10b, 11b, and 12b denote yellow patterns (hereafter referred to as "Y"), reference numerals 9c, 10c, 11c, and 12c denote magenta patterns (hereafter referred to as "M"), and reference numerals 9d, 10d, 11d, and 12d denote cyan patterns (hereafter referred to as "C").

Reference numerals tsf1 to tsf4, tmf1 to tmf4, tsr1 to tsr4, and tmr1 to tmr4 denote timings with which sensors 6a and 6b detect the patterns. The arrow A denotes the direction in which a conveying belt 3 moves.

Here, the movement speed of the conveying belt 3 is defined as v mm/s, Bk is assumed to denote a reference color, and the theoretical distances between each of the color pattern for the sheet conveying direction and the Bk pattern is defined as dsY mm, dsM mm, and dsC mm. The measured distances between each of the color pattern for the sheet conveying direction and a corresponding one of the patterns for the scanning direction are defined as dmfBk mm, dmfY mm, dmfM mm, and dmfC mm on the left side and as dmrBk mm, dmrY mm, dmrM mm, and dmrC mm on the right side.

When the Bk is assumed to denote the reference color, aberration δes in the sub-scanning direction for each color is expressed by:

$$\delta esY = v^* \{(tsf2-tsf1)+(tsr2-tsr1)\}/2 - dsY \quad (1)$$

$$\delta esM = v^* \{(tsf3-tsf1)+(tsr3-tsr1)\}/2 - dsM \quad (2)$$

$$\delta esC = v^* \{(tsf4-tsf1)+(tsr4-tsr1)\}/2 - dsC \quad (3)$$

Further, left and right aberrations δemf and δemr in the main-scanning direction for each color are expressed by the following (12) to (17) on the basis of the following (4) to (11).

$$dmfBk = v^*(tmf1-tsf1) \quad (4)$$

$$dmfY = v^*(tmf2-tsf2) \quad (5)$$

$$dmfM = v^*(tmf3-tsf3) \quad (6)$$

$$dmfC = v^*(tmf4-tsf4) \quad (7)$$

$$dmrBK = v^*(tmf1-tsf1) \quad (8)$$

$$dmrY = v^*(tmf2-tsf2) \quad (9)$$

$$dmrM = v^*(tmf3-tsf3) \quad (10)$$

$$dmrC = v^*(tmf4-tsf4) \quad (11)$$

$$\delta emfY = dmfY - dmfBK \quad (12)$$

$$\delta emfM = dmfM - dmfBK \quad (13)$$

$$\delta emfC = dmfC - dmfBK \quad (14)$$

$$\delta emrY = dmrY - dmrBK \quad (15)$$

$$\delta emrM = dmrM - dmrBK \quad (16)$$

$$\delta emrC = dmrC - dmrBK \quad (17)$$

Thus, the aberration directions can be determined depending on whether the results of the calculations are positive or negative. The δemf is used to correct the write start position, whereas the δemr−δemf is used to correct the scanning width.

In the case when the scanning width has an error, the write start position is calculated by using not only the δemf but also the variation of the image frequency associated with the correction of the scanning width.

In the following description, if the color aberration detecting patterns in FIG. 3 are used, the line width thereof is assumed to be 35 dots, the length thereof in the main-scanning direction is assumed to be 100 dots, and the space between the patterns is assumed to correspond to 50 dots.

The conventional examples, however, have the following disadvantages.

Due to the eccentricity of a belt driving roller, the irregular rotation of a driving part, or the like, the movement speed v mm/s of the conveying belt 3 is not always fixed, resulting in a detection error proportional to the temporal difference between the patterns.

If this detection error is caused by periodically irregular driving, it can be eliminated by arranging the plural sets of position aberration detecting patterns at appropriate locations, calculating the misalignments thereof, and averaging them. For non-periodic irregularity, however, the detection error cannot be eliminated even with the averaging process.

For example, with a 600-dpi image forming apparatus in which one dot is 42.3 μm, if the position aberration is to be detected with an accuracy of ¼ to ⅛ dots, detection errors arising from non-periodic irregularity are not negligible. Thus, action must be taken to avoid being affected by the non-periodic irregularity.

Specifically, for this purpose, the interval between the alignment detecting pattern for the reference color and the alignment detecting pattern for the detected color must be reduced, and the alignment detecting patterns must be closely transferred onto the conveying belt.

SUMMARY OF THE INVENTION

The present invention is adapted to solve the above problems, and it is an object thereof to reduce errors in position aberration detection arising from non-periodic irregularity in order to enable very accurate position aberration corrections.

The present invention is characterized by an image forming apparatus, including:

a plurality of image forming means each having an image bearing body and write means for forming images of different colors on the image bearing body;

a moving member moving so as to transfer the images formed on the image bearing body by the plurality of image forming means to corresponding transfer locations;

a pattern forming means for controlling the plurality of image forming means so as to form a plurality of pattern images in a direction crossing a movement direction of the moving member so that two pattern images of a predetermined reference color are transferred onto the moving member with one pattern image of a different color transferred therebetween;

a pattern detecting means for detecting the pattern images transferred onto the moving member;

an aberration detecting means for detecting aberration of the image of the different color with respect to the images of the reference color on the basis of an output from the pattern detecting means; and a correction means for correcting the aberration of the image of the different color on the basis of aberration detected by the aberration detecting means.

Furthermore, the present invention is characterized by an image forming apparatus, comprising:

a plurality of image forming means each having an image bearing body and write means for forming images of different colors on the image bearing body;

a moving member moving so as to transfer the images formed on the image bearing body by the plurality of image forming means to corresponding transfer locations;

a pattern forming means for controlling the plurality of image forming means so as to form a plurality of pattern images in a direction crossing a movement direction of the moving member so that a pattern image of a predetermined reference color and a pattern image of a different color are alternatively transferred onto the moving member a predetermined number of times;

a pattern detecting means for detecting the pattern images transferred onto said moving member;

an aberration detecting means for detecting aberration of the image of the different color with respect to the images of the reference color on the basis of an output from the pattern detecting means; and a correction means for correcting the aberration of the image of the different color on the basis of the aberration detected by the aberration detecting means.

The other objects, configurations, and effects of the present invention will be apparent from the following detailed description and drawings.

DETAILED DESCRIPTION OF THE PREFERRED EMBODIMENTS

Embodiments of the present invention will be described below in detail with reference to the drawings.

Figure 1:
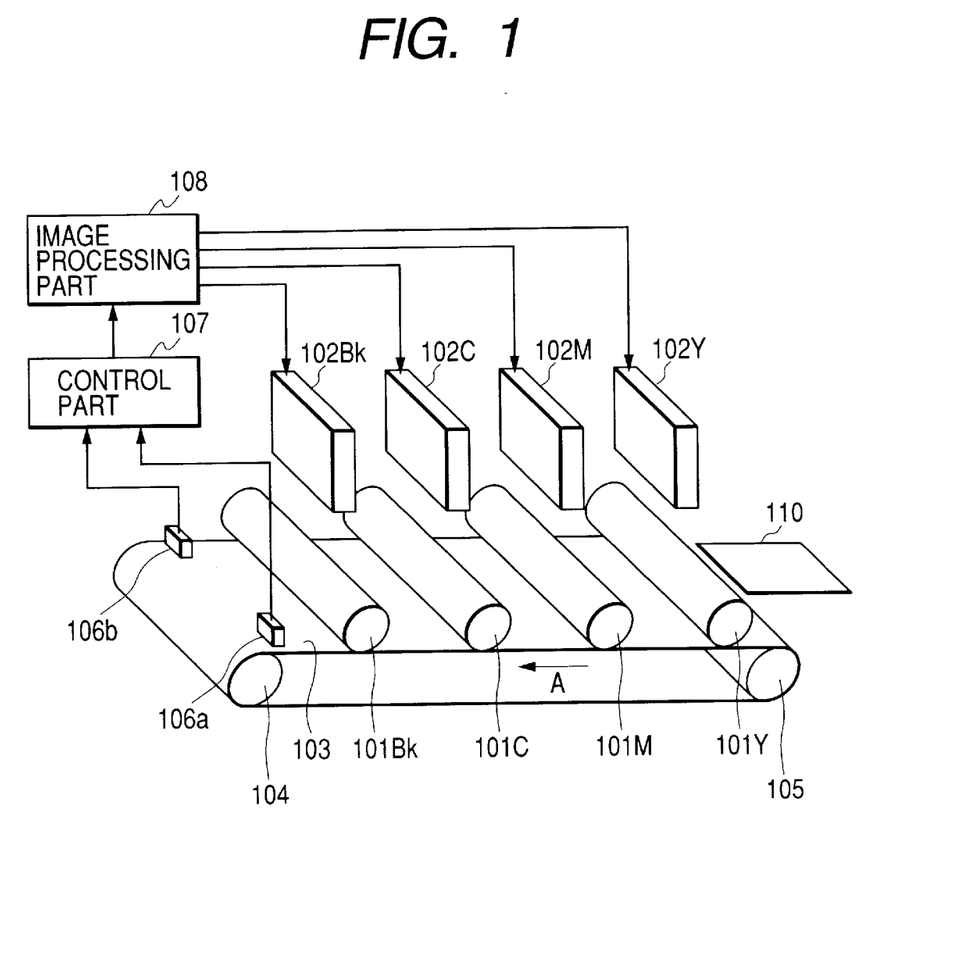
FIG. 1 is a view showing a configuration of an image forming apparatus to which the present invention is applied.

FIG. 1 is a view showing a configuration of an image forming apparatus to which the present invention is applied.

The apparatus in FIG. 1 comprises an image forming part for forming images of four colors, that is, yellow, magenta, cyan, and black.

In this drawing, reference numerals 101Y, 101M, 101C, and 101BK denote photosensitive drums for electrostatic latent images of Y, M, C, and Bk. Reference numerals 102Y, 102M, 102C, and 102Bk denote optical parts for forming electrostatic latent images by irradiating the photosensitive drums 101Y, 101M, 101C, and 101Bk with a laser beam in accordance with an image signal from an image processing part 108. The optical part has a light source for laser beams, a reflecting mirror, and others. As well known, a charger, a developing machine, and others are provided around each photosensitive drum.

Further, reference numeral 103 denotes a conveying belt that moves in a direction shown by an arrow A in the drawing to sequentially convey recording sheets 110 to each image forming part. Reference numeral 104 denotes a driving roller connected to a driving part (not shown) composed of a motor, a gear, and others, in order to drive the conveying belt 103. Reference numeral 105 denotes a following roller that rotates so as to follow movement of the conveying belt 103 and that applies a fixed tension to the conveying belt 103. Reference numerals 106a and 106b denote sensors provided so as to correspond to belt ends, in order to read pattern images formed on the belt 103 as described later. Reference numeral 107 denotes a control part for correcting color aberration on the basis of outputs from the sensors 106a and 106b and causing the optical part 102 to form pattern images. Reference numeral 108 denotes an image processing part for processing externally input image signals and outputting image signals for corresponding colors to the corresponding optical parts.

Now, a normal image forming operation performed by the apparatus in FIG. 1 will be described.

First, when the optical parts 102 are each ready for starting printing, the control part (not shown) drives a resist roller to feed a recording sheet 110 onto the conveying belt 103, while on the basis of this conveyance start timing, the image processing part 106 outputs image signals to the optical parts 102.

Then, the optical parts 102 each form an electrostatic latent image on the corresponding photosensitive drum 110, the developing machine (not shown) develops toner images of the corresponding colors, and a transfer part (not shown) transfers the toner images on the recording sheet 110 at respective transfer locations. In the apparatus in FIG. 1, the toner images are transferred in the order of the Y, M, C, and Bk. Subsequently, the recording sheet 110 is separated from the conveying sheet 103, and a fixing device (not shown) fixes the toner images to the recording sheet, which is then discharged to an exterior of the apparatus.

Next, a color aberration correcting process according to this embodiment will be described.

This color aberration correcting process is executed with timings different from those for the normal image forming process. For example, it is executed when a power supply is turned on.

Figure 5:
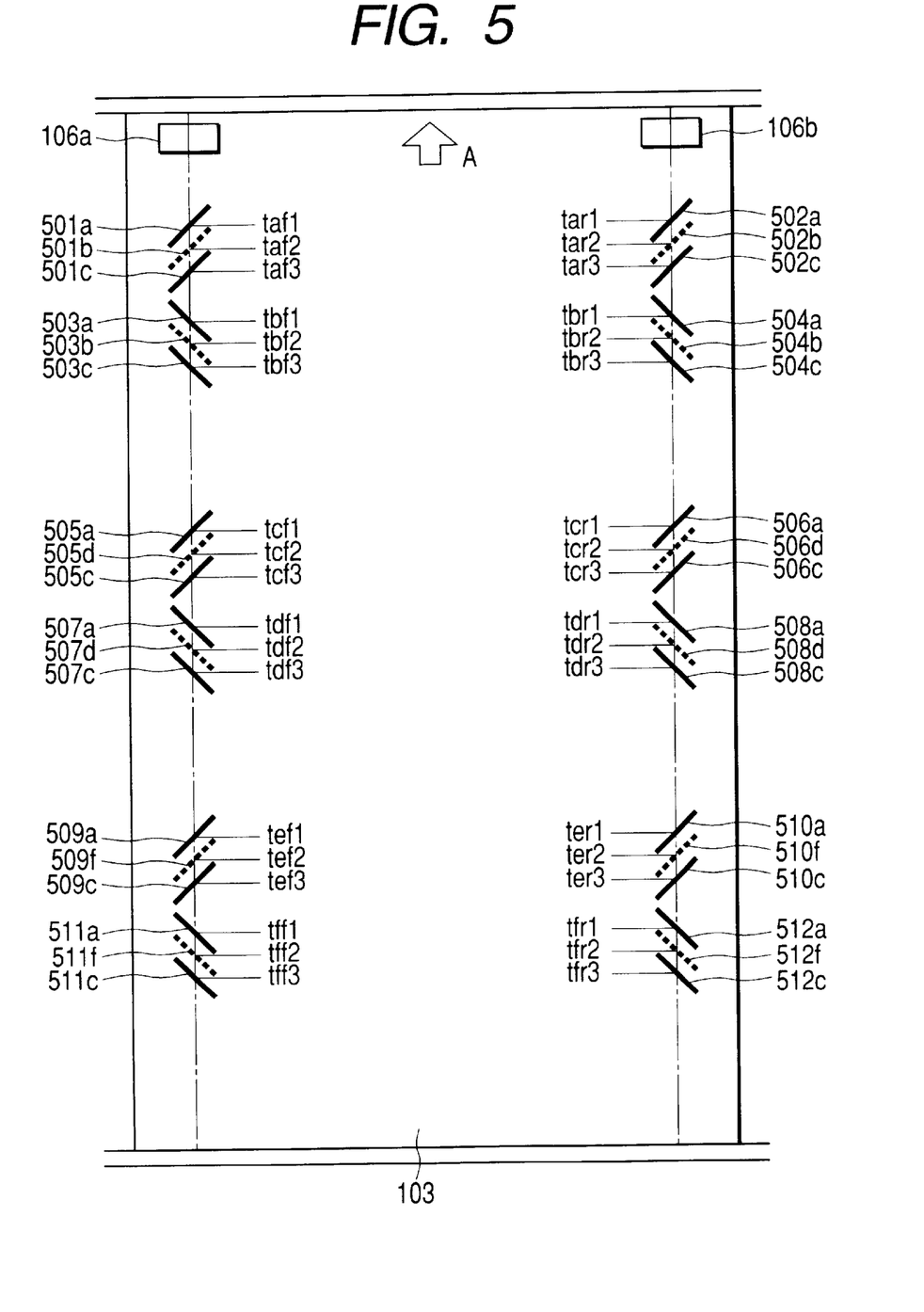
FIG. 5 is a view showing pattern images according to an embodiment of the present invention.

In this embodiment, for the color aberration correcting process, the control part 107 controls the image forming part 108 to output pattern image data stored in a memory in the image processing part 108, to each of the optical parts 102, thereby forming a pattern image such as the one shown in FIG. 5, on the conveying belt 103.

FIG. 5 is a view showing aberration detecting pattern images formed on the belt 103 according to this embodiment. In this embodiment, the aberration detecting pattern images for the corresponding colors are formed on the opposite ends of the belt 103.

In FIG. 5, reference numerals 501 to 512 denote the pattern images for detecting aberration in the sub-scanning and main-scanning directions. In this embodiment, the pattern images are inclined from a belt moving direction through 45°. This angle is not limited to 45° but may have another angle value.

Further, the pattern images shown with subscripts a and c are for the reference color (in this embodiment, Bk), the pattern images shown with subscript b are for a detected color Y, the pattern images shown with subscript d are for a detected color M, and the pattern images shown with subscript f are for a detected color C.

Further, reference numerals taf1 to taf3, tar1 to tar3, tbf 1 to tbf3, tbr1 to tbr3, tcf1 to tcf3, tcr1 to tcr3, tdf1 to tdf3, tdr1 to tdr3, tef1 to tef3, ter1 to ter3, tff1 to tff3, and tfr1 to tfr3 denote detection timings for the corresponding patterns. Arrow A shows the movement direction of the conveying belt 103.

Figure 4:
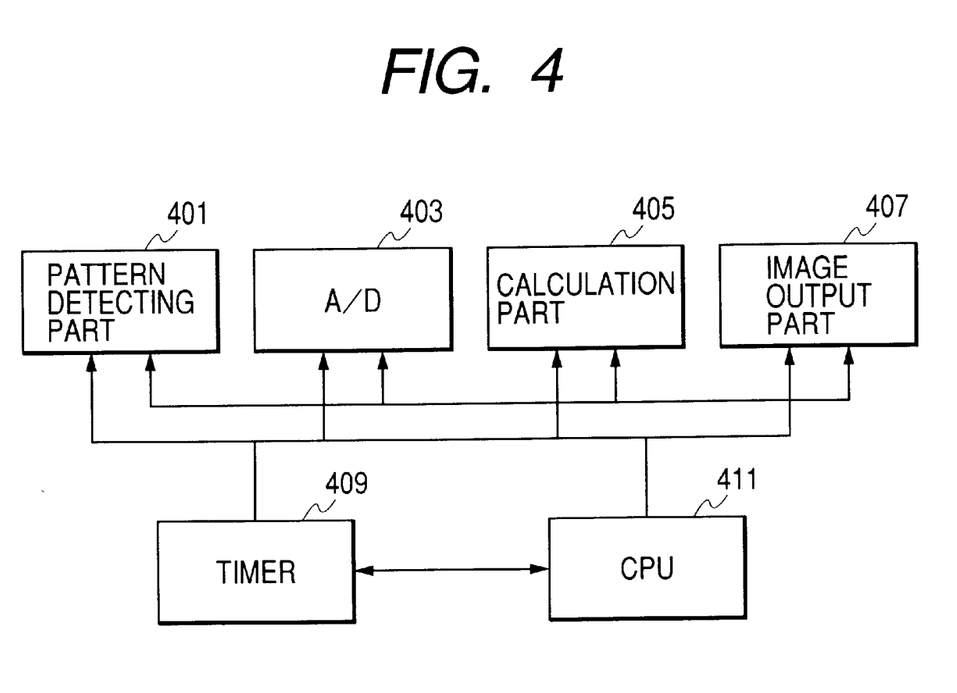
FIG. 4 is a view showing a configuration of a control part shown in FIG. 1.

Now, a specific misalignment detection operation will be described. FIG. 4 is a view showing a configuration of an integral part of the control part 107 in FIG. 1.

In FIG. 4, when the color aberration correcting process is started, a CPU 411 first resets a timer 409 and outputs signals indicating that corresponding operations are to be started, to the sensors 106a and 106b shown in FIG. 1, a pattern detecting part 401 including a light for irradiating the pattern images with light, an A/D converting part 403, a calculation part 405, and an output part 407.

The pattern detecting part 401 operates on the basis of an output from the timer 409 to read the pattern images shown in FIG. 5, by using predetermined timings. The A/D converting part 403 converts read outputs for the corresponding patterns obtained from the pattern detecting part 401, into digital signals, which are then output to the calculation part 405. The calculation part 405 detects the detection timings for the corresponding pattern images on the basis of the outputs from the A/D converting part 403 and the timer 409, determines the aberration on the basis of the detection timings for the corresponding pattern images, and outputs them to the output part 407. On the basis of the aberration information from the calculation part 405, the output part 407 generates and outputs control signals to the image processing part 108, the signals controlling timings with which the image signals are output to the corresponding optical parts 102.

Now, the aberration calculation process executed by the calculation part 405 will be described.

The calculation part 405 determines the aberration in the sub-scanning and main-scanning directions on the basis of the detection timings for the reference color pattern images and for the detected color pattern images.

When the movement speed of the conveying belt 103 is defined as v mm/s, the aberration $\delta esf$ and $\delta esr$ on the respective sides of the conveying belt 103 with respect to the sub-scanning direction for each color are expressed by:

$$\delta esfY1 = v^*[\{(taf2-taf1)-(taf3-taf2)\}/2 + \{(tbf2-tbf1)-(tbf3-tbf2)\}/2]/2 \quad (18)$$

$$\delta esrY1 = v^*[\{(tar2-tar1)-(tar3-tar2)\}/2 + \{(tbr2-tbr1)-(tbr3-tbr2)\}/2]/2 \quad (19)$$

$$\delta esfM1 = v^*[\{(tcf2-tcf1)-(tcf3-tcf2)\}/2 + \{(tdf2-tdf1)-(tdf3-tdf2)\}/2]/2 \quad (20)$$

$$\delta esrM1 = v^*[\{(tcr2-tcr1)-(tcr3-tcr2)\}/2 + \{(tdr2-tdr1)-(tdr3-tdr2)\}/2]/2 \quad (21)$$

$$\delta esfC1=v*[\{(tef2-tef1)-(tef3-tef2)\}/2+\{(tff2-tff1)-(tff3-tff2)\}/2]/2 \quad (22)$$

$$\delta esrC1=v*[\{(ter2-ter1)-(ter3-ter2)\}/2+\{(tfr2-tfr1)-(tfr3-tfr2)\}/2]/2 \quad (23).$$

Then, the aberrations δes for the corresponding colors are expressed by:

$$\delta esY1=(\delta esfY1+\delta esrY1)/2 \quad (24)$$

$$\delta esM1=(\delta esfM1+\delta esrM1)/2 \quad (25)$$

$$\delta esC1=(\delta esfC1+\delta esrC1)/2 \quad (26).$$

Further, the aberrations δemf and δemr on the respective sides of the conveying belt with respect to the main-scanning direction for each color are expressed by:

$$\delta emfY1=v*[\{(taf2-taf1)-(taf3-taf2)\}/2-\{(tbf2-tbf1)-(tbf3-tbf2)\}/2]/2 \quad (27)$$

$$\delta emrY1=v*[\{(tar2-tar1)-(tar3-tar2)\}/2-\{(tbr2-tbr1)-(tbr3-tbr2)\}/2]/2 \quad (28)$$

$$\delta emfM1=v*[\{(tcf2-tcf1)-(tcf3-tcf2)\}/2-\{(tdf2-tdf1)-(tdf3-tdf2)\}/2]/2 \quad (29)$$

$$\delta emrM1=v*[\{(tcr2-tcr1)-(tcr3-tcr2)\}/2-\{(tdr2-tdr1)-(tdr3-tdr2)\}/2]/2 \quad (30)$$

$$\delta emfC1=v*[\{(tef2-tef1)-(tef3-tef2)\}/2-\{(tff2-tff1)-(tff3-tff2)\}/2]/2 \quad (31)$$

$$\delta emrC1=v*[\{(ter2-ter1)-(ter3-ter2)\}/2-\{(tfr2-tfr1)-(tfr3-tfr2)\}/2]/2 \quad (32).$$

Then, the aberrations δem for the corresponding colors are expressed by:

$$\delta emY1=(\delta emfY1+\delta emrY1)/2 \quad (33)$$

$$\delta emM1=(\delta emfM1+\delta emrM1)/2 \quad (34)$$

$$\delta emC1=(\delta emfC1+\delta emrC1)/2 \quad (35).$$

Accordingly, the aberration directions can be determined depending on whether the results of the calculations are positive or negative. The write start location is corrected on the basis of the δem, and the general scale in the scanning direction is corrected on the basis of the δemr–δemf.

In the case when the general scale in the scanning direction has an error, the write start position is calculated by using not only the δem but also the variation of the image frequency associated with the correction of the general scale in the scanning direction.

The color aberration detecting patterns shown in FIG. 5 are not limited to either the main-scanning or sub-scanning direction and are arranged so that the detected color pattern is sandwiched between the reference color patterns. Thus, the color aberration detecting patterns can be closely transferred onto the conveying belt 3. Further, unlike the color aberration detecting patterns shown in FIG. 3, the color aberration detecting patterns shown in FIG. 5 need not retain theoretical values for the reference and detected colors (the dsY of Equation 1, the dsM of Equation 2, and the dsC of Equation 3). This reduces errors in the detection of the pattern images executed by the sensor 106 which errors are caused by variations in the speed of the conveying belt 103.

Next, a second embodiment of the present invention will be described.

Figure 6:
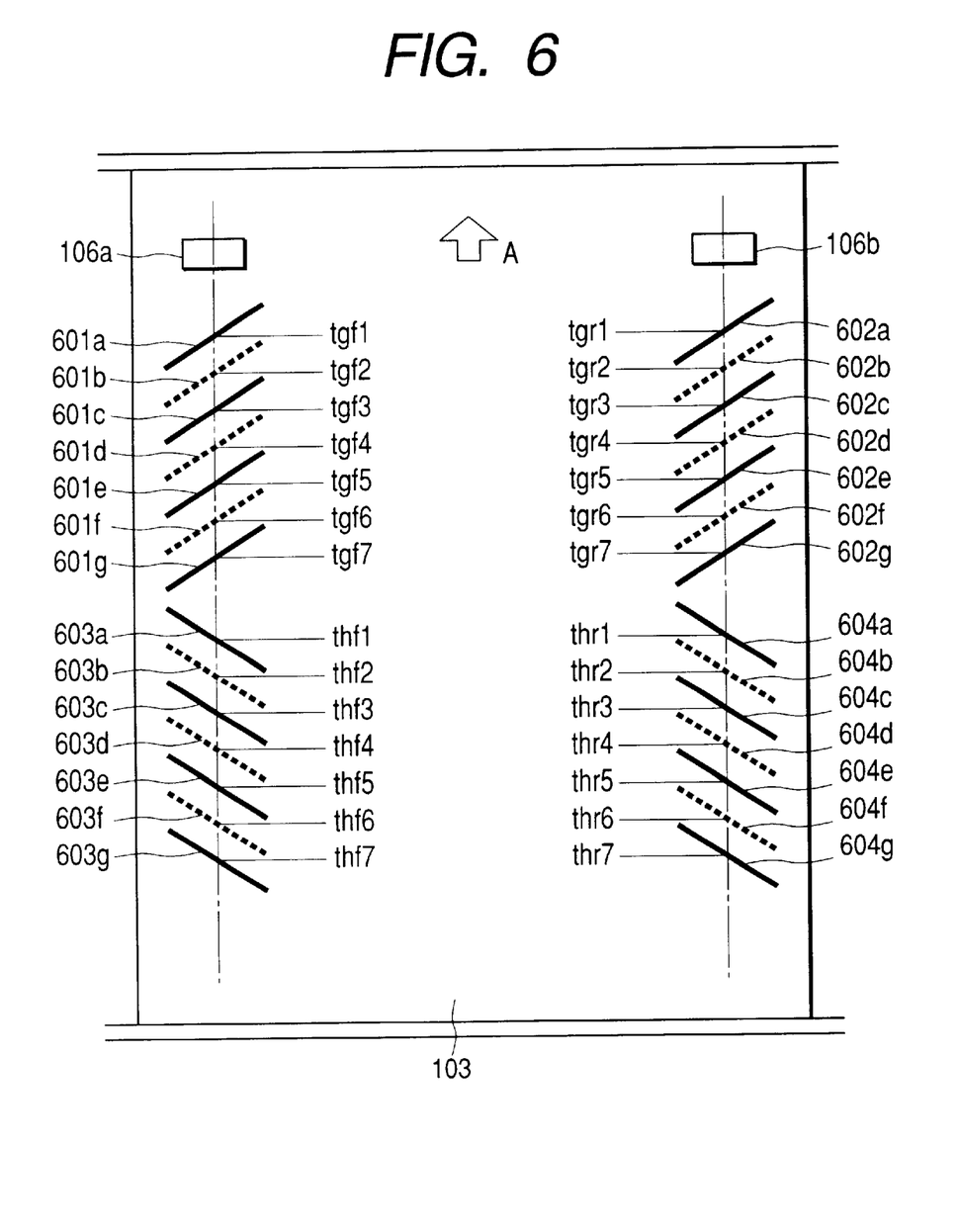
FIG. 6 is a view showing other pattern images according to an embodiment of the present invention.

FIG. 6 shows pattern images formed on the belt 103 according to this embodiment.

In FIG. 6, reference numerals 601 to 604 denote the pattern images for detecting aberration in the sub-scanning and main-scanning directions. Also in this embodiment, the pattern images are inclined from the belt moving direction through 45°.

Further, the pattern images shown with subscripts a, c, e, and g are for the reference color Bk, and the subscripts b, d, and f indicate the patterns for the detected colors Y, M, and C similarly as FIG. 5. Moreover, reference numerals tgf1 to tgf7, thf1 to thf7, tgr1 to tgr7, and thr1 to thr7 denote detection timings for the corresponding patterns. An arrow A shows the movement direction of the conveying belt 103.

The configuration of the image forming part of this embodiment is similar to that of the above described embodiment.

Now, the aberration calculating process executed by the calculation part 405 will be described.

The calculation part 405 determines the aberration in the sub-scanning and main-scanning directions on the basis of the detection timings for the reference color pattern images and for the detected color pattern images.

When the movement speed of the conveying belt 103 is defined as v mm/s, the aberration δesf and δesr on the respective sides of the conveying belt 103 with respect to the sub-scanning direction for each color are expressed by:

$$\delta esfY1=v*[\{(tgf2-tgf1)-(tgf3-tgf2)\}/2+\{(thf2-thf1)-(thf3-thf2)\}/2]/2 \quad (36)$$

$$\delta esrY1=v*[\{(tgr2-tgr1)-(tgr3-tgr2)\}/2+\{(thr2-thr1)-(thr3-thr2)\}/2]/2 \quad (37)$$

$$\delta esfM1=v*[\{(tgf4-tgf3)-(tgf5-tgf4)\}/2+\{(thf4-thf3)-(thf5-thf4)\}/2]/2 \quad (38)$$

$$\delta esrM1=v*[\{(tgr4-tgr3)-(tgr5-tgr4)\}/2+\{(thr4-thr3)-(thr5-thr4)\}/2]/2 \quad (39)$$

$$\delta esfC1=v*[\{(tgf6-tgf5)-(tgf7-tgf6)\}/2+\{(thf6-thf5)-(thf7-thf6)\}/2]/2 \quad (40)$$

$$\delta esrC1=v*[\{(tgr6-tgr5)-(tgr7-tgr6)\}/2+\{(thr6-thr5)-(thr7-thr6)\}/2]/2 \quad (41).$$

Then, the aberrations δes for the corresponding colors expressed by:

$$\delta esY1=(\delta esfY1+\delta esrY1)/2 \quad (42)$$

$$\delta esM1=(\delta esfM1+\delta esrM1)/2 \quad (43)$$

$$\delta esC1=(\delta esfC1+\delta esrC1)/2 \quad (44).$$

The above method is used to calculate the aberrations of one set of alignment detecting patterns, and plural (n) sets of alignment detecting patterns δaesY, δaesM, and δaesC are determined by:

$$\delta aesY = \sum_{i=1}^{n} \delta esY_i/n \quad (45)$$

$$\delta aesM = \sum_{i=1}^{n} \delta esM_i/n \quad (46)$$

$$\delta aesC = \sum_{i=1}^{n} \delta esC_i/n \quad (47)$$

Further, the aberrations δemf and δemr on the respective sides of the conveying belt 103 with respect to the main-scanning direction for each color are expressed by:

$$\delta emfY1 = v*[\{(tgf2-tgf1)-(tgf3-tgf2)\}/2-\{(thf2-thf1)-(thf3-thf2)\}/2]/2 \quad (48)$$

$$\delta emrY1 = v*[\{(tgr2-tgr1)-(tgr3-tgr2)\}/2-\{(thr2-thr1)-(thr3-thr2)\}/2]/2 \quad (49)$$

$$\delta emfM1 = v*[\{(tgf4-tgf3)-(tgf5-tgf4)\}/2-\{(thf4-thf3)-(thf5-thf4)\}/2]/2 \quad (50)$$

$$\delta emrM1 = v*[\{(tgr4-tgr3)-(tgr5-tgr4)\}/2-\{(thr4-thr3)-(thr5-thr4)\}/2]/2 \quad (51)$$

$$\delta emfC1 = v*[\{(tgf6-tgf5)-(tgf7-tgf6)\}/2-\{(thf6-thf5)-(thf7-thf6)\}/2]/2 \quad (52)$$

$$\delta emrC1 = v*[\{(tgr6-tgr5)-(tgr7-tgr6)\}/2-\{(thr6-thr5)-(thr7-thr6)\}/2]/2 \quad (53).$$

Then, the aberration δem for the corresponding colors are expressed by:

$$\delta emY1 = (\delta emfY1 + \delta emrY1)/2 \quad (54)$$

$$\delta emM1 = (\delta emfM1 + \delta emrM1)/2 \quad (55)$$

$$\delta emC1 = (\delta emfC1 + \delta emrC1)/2 \quad (56).$$

Accordingly, the offset directions of aberration can be determined depending on whether the results of the calculations are positive or negative. The write start location is corrected on the basis of the δem, and the general scale in the scanning direction is corrected on the basis of the δemr−δemf. If the general scale in the scanning direction has an error, the write start position is calculated using not only the δem but also the variation of the image frequency associated with the correction of the general scale in the scanning direction.

The above method is used to calculate the aberration of one set of aberration detecting patterns, and plural (n) sets of aberration detecting patterns δaemY, δaemM, and δaemC are determined by:

$$\delta aemY = \sum_{i=1}^{n} \delta emY_i / n \quad (57)$$

$$\delta aemM = \sum_{i=1}^{n} \delta emM_i / n \quad (58)$$

$$\delta aemC = \sum_{i=1}^{n} \delta emC_i / n \quad (59)$$

The color aberration detecting patterns shown in FIG. 6 are arranged so that the detected color pattern is sandwiched between the reference color patterns. A double accuracy can be obtained by thus sandwiching the detected color pattern between the reference color patterns. A description will be given of the usefulness of the color aberration detecting patterns shown in FIG. 6, compared to the color aberration detecting patterns shown in FIG. 3.

For the color aberration detecting patterns, the line width thereof is assumed to be 35 dots, the length thereof in the main-scanning direction is assumed to be 100 dots, and the space between the patterns is assumed to correspond to 50 dots. Then, one set of the color aberration detecting patterns shown in FIG. 6 have a length of 35×14+50×15+100=1340 dots.

On the other hand, one set of the color aberration detecting patterns shown in FIG. 3 have a length of 35×8+50×7+100=730 dots. As described previously, two sets of the color aberration detecting patterns shown in FIG. 3 correspond to one set of the color aberration detecting patterns shown in FIG. 6, thus requiring 730×2=1,460 dots.

This result indicates that the color aberration detecting patterns shown in FIG. 6 can be more closely arranged. Thus, these patterns are unlikely to be affected by non-periodic irregularity. This indicates that the color aberration detecting patterns shown in FIG. 6 is useful.

Further, the photosensitive drum 101 and the conveying belt 103 involve driving and conveying irregularities, respectively, so that for the purpose of avoiding being affected by these irregularities, the interval between the reference and detected colors must be reduced.

In the color aberration detecting patterns shown in FIG. 6, the interval between the reference and detected colors is always 50 dots. On the other hand, in the color aberration detecting patterns shown in FIG. 3, the interval between the Y and Bk is 50×3+35×2=220 dots. This result indicates that the color aberration detecting patterns shown in FIG. 6 are more unlikely to be affected by the driving irregularity.

For the patterns shown in FIG. 3 and comprising combinations of the horizontal and oblique lines, if the color aberration in the scanning direction is to be calculated, the interval between the patterns of the oblique and horizontal lines of the same color must be detected. In the color aberration detecting patterns shown in FIG. 3, the interval between the patterns of the oblique and horizontal lines of the same color is 50×3+35×3+100=355 dots.

On the other hand, for the color aberration detecting patterns shown in FIG. 6, if the color aberration in the scanning direction is to be calculated, the interval between the reference and detected-color patterns of the same shape may be detected. In the color aberration detecting patterns shown in FIG. 5, the interval between the reference- and detected-color patterns of the same shape is always 50 dots. Thus, even if the color aberration in the scanning direction is to be calculated, the color aberration detecting patterns shown in FIG. 6 are more unlikely to be affected by the driving irregularity. This reduces errors in the detection executed by the sensor 106 which errors are caused by non-periodic irregularity.

Now, a third embodiment of the present invention will be described.

Figure 7:
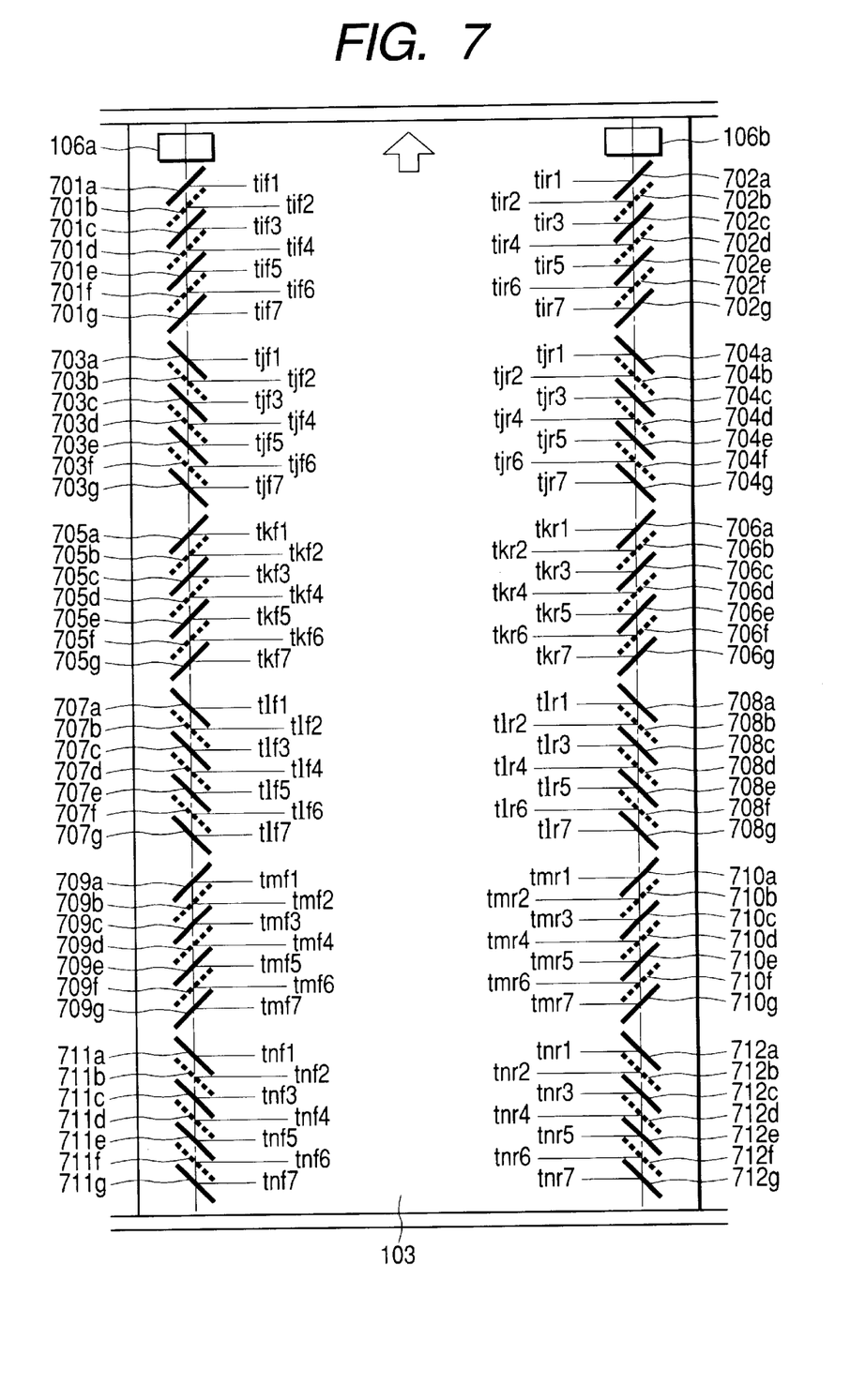
FIG. 7 is a view showing other pattern images according to an embodiment of the present invention.

FIG. 7 shows pattern images formed on the belt 103 according to this embodiment.

In FIG. 7, reference numerals 701 to 712 denote the pattern images for detecting aberrations in the sub-scanning and main-scanning directions. Also in this embodiment, the pattern images are inclined from the belt moving direction through 45°.

Further, in the pattern images, the patterns shown with subscripts a, c, e, and g are for the detected colors. Reference numerals 701 to 704 denote the Y patterns, reference numerals 705 to 708 denote the M patterns, and reference numerals 709 to 712 denote the C patterns. The patterns shown with the subscripts b, d, and f are for the reference color BK.

Moreover, reference numerals tif1 to tif7, tir1 to tir7, tjf 1 to tjf7, tjr1 to tjr7, tkf1 to tkf7, tkr1 to tkr7, tlf1 to tlf7, and tlr1 to tlr7 denote detection timings for the corresponding patterns. Arrow A shows the movement direction of the conveying belt 103.

The configuration of the image forming part of this embodiment is also similar to that of the above described embodiment.

Now, the aberration calculating process executed by the calculation part 405 according to this embodiment will be described.

The calculation part 405 determines the aberration in the sub-scanning and main-scanning directions on the basis of the detection timings for the reference color pattern images and for the detected color pattern images.

When the movement speed of the conveying belt 103 is defined as v mm/s and the BK is assumed to be the reference color, the aberrations δesf on the left side of the conveying belt 103 with respect to the sub-scanning direction for each color are expressed by:

$$\delta esfY1 = v^*[\{(tif2-tif1)-(tif3-tif2)\}+$$
$$(tif4-tif3)-(tif5-tif4)+(tif6-tif5)-(tif7-tif6)\}/6+\{(tjf2-tjf1)-(tjf3-tjf2)+(tjf4-tjf3)-(tjf5-tjf4)+(tjf6-tjf5)-(tjf7-tjf6)\}$$
$$/6]/2 \quad (60)$$

$$\delta esrY1 = v^*[\{(tir2-tir1)-(tir3-tir2)\}+$$
$$(tir4-tir3)-(tir5-tir4)+(tir6-tir5)-(tir7-tir6)\}/6+\{(tjr2-tjr1)-(tjr3-tjr2)+(tjr4-tjr3)-(tjr5-tjr4)+(tjr6-tjr5)-(tjr7-tjr6)\}$$
$$/6]/2 \quad (61)$$

$$\delta esfM1 = v^*[\{(tkf2-tkf1)-(tkf3-tkf2)+$$
$$(tkf4-tkf3)-(tkf5-tkf4)+(tkf6-tkf5)-(tkf7-tkf6)\}/6+\{(tlf2-tlf1)-(tlf3-tlf2)+(tlf4-tlf3)-(tlf5-tlf4)+(tlf6-tlf5)-(tlf7-tlf6)\}$$
$$/6]/2 \quad (67)$$

$$\delta esrM1 = v^*[\{(tkr2-tkr1)-(tkr3-tkr2)+$$
$$(tkr4-tkr3)-(tkr5-tkr4)+(tkr6-tkr5)-(tkr7-tkr6)\}/6+\{(tlr2-tlr1)-(tlr3-tlr2)+(tlr4-tlr3)-(tlr5-tlr4)+(tlr6-tlr5)-(tlr7-tlr6)\}$$
$$/6]/2 \quad (68)$$

$$\delta esfC1 = v^*[\{(tmf2-tmf1)-(tmf3-tmf2)+$$
$$(tmf4-tmf3)-(tmf5-tmf4)+(tmf6-tmf5)-(tmf7-tmf6)\}/6+\{(tnf2-tnf1)-(tnf3-tnf2)+(tnf4-tnf3)-(tnf5-tnf4)+(tnf6-tnf5)-(tnf7-tnf6)\}$$
$$/6]/2 \quad (69)$$

$$\delta esrC1 = v^*[\{(tmr2-tmr1)-(tmr3-tmr2)+$$
$$(tmr4-tmr3)-(tmr5-tmr4)+(tmr6-tmr5)-(tmr7-tmr6)\}/6+\{(tnr2-tnr1)-(tnr3-tnr2)+(tnr4-tnr3)-(tnr5-tnr4)+(tnr6-tnr5)-(tnr7-tnr6)\}$$
$$/6]/2 \quad (70).$$

Accordingly, the aberrations δes are obtained by the above Equations (42), (43), and (44).

Further, the aberrations δemf and δemr on the respective sides of the conveying belt 103 with respect to the main-scanning direction for each color are expressed by:

$$\delta emfY1 = v^*[\{(tif2-tif1)-(tif3-tif2)+$$
$$(tif4-tif3)-(tif5-tif4)+(tif6-tif5)-(tif7-tif6)\}/6-\{(tjf2-tjf1)-(tjf3-tjf2)+(tjf4-tjf3)-(tjf5-tjf4)+(tjf6-tjf5)-(tjf7-tjf6)\}$$
$$/6]/2 \quad (74)$$

$$\delta emrY1 = v^*[\{(tir2-tir1)-(tir3-tir2)+$$
$$(tir4-tir3)-(tir5-tir4)+(tir6-tir5)-(tir7-tir6)\}/6-\{(tjr2-tjr1)-(tjr3-tjr2)+(tjr4-tjr3)-(tjr5-tjr4)+(tjr6-tjr5)-(tjr7-tjr6)\}$$
$$/6]/2 \quad (75)$$

$$\delta emfM1 = v^*[\{(tkf2-tkf1)-(tkf3-tkf2)+$$
$$(tkf4-tkf3)-(tkf5-tkf4)+(tkf6-tkf5)-(tkf7-tkf6)\}/6-\{(tlf2-tlf1)-(tlf3-tlf2)+(tlf4-tlf3)-(tlf5-tlf4)+(tlf6-tlf5)-(tlf7-tlf6)\}$$
$$/6]/2 \quad (76)$$

$$\delta emrM1 = v^*[\{(tkr2-tkr1)-(tkr3-tkr2)+$$
$$(tkr4-tkr3)-(tkr5-tkr4)+(tkr6-tkr5)-(tkr7-tkr6)\}/6-\{(tlr2-tlr1)-(tlr3-tlr2)+(tlr4-tlr3)-(tlr5-tlr4)+(tlr6-tlr5)-(tlr7-tlr6)\}$$
$$/6]/2 \quad (77)$$

$$\delta emfC1 = v^*[\{(tmf2-tmf1)-(tmf3-tmf2)+$$
$$(tmf4-tmf3)-(tmf5-tmf4)+(tmf6-tmf5)-(tmf7-tmf6)\}/6-\{(tnf2-tnf1)-(tnf3-tnf2)+(tnf4-tnf3)-(tnf5-tnf4)+(tnf6-tnf5)-(tnf7-tnf6)\}$$
$$/6]/2 \quad (78)$$

$$\delta emrC1 = v^*[\{(tmr2-tmr1)-(tmr3-tmr2)+$$
$$(tmr4-tmr3)-(tmr5-tmr4)+(tmr6-tmr5)-(tmr7-tmr6)\}/6-\{(tnr2-tnr1)-(tnr3-tnr2)+(tnr4-tnr3)-(tnr5-tnr4)+(tnr6-tnr5)-(tnr7-tnr6)\}$$
$$/6]/2 \quad (79).$$

Accordingly, the aberrations δem are obtained by the above Equations (54), (55), and (56).

The offset directions of aberration can be determined depending on whether the results of these calculations are positive or negative. The write start location is corrected on the basis of the δem, and the general scale in the scanning direction is corrected on the basis of the δemr−δemf. If the general scale in the scanning direction has an error, the write start position is calculated using not only the δem but also the variation of the image frequency associated with the correction of the general scale in the scanning direction.

In the pattern image shown in FIG. 7, the line width of the color aberration detecting patterns is assumed to be 35 dots, the length thereof in the main-scanning direction is assumed to be 100 dots, and the space between the patterns is assumed to correspond to 50 dots. Then, the color aberration detecting patterns shown in FIG. 7 have a length of (35×14+50×17)×3+50×2=4120 dots.

On the other hand, one set of the color aberration detecting patterns shown in FIG. 3 has a length of 35×8+50×7+100=730 dots.

Six sets of the color aberration detecting patterns shown in FIG. 3 enable an aberration detecting process equivalent to that enabled by the color aberration detecting patterns shown in FIG. 7; six sets of the patterns of FIG. 3 require 730×6+50×5=4,630 dots.

As apparent from this result, the color aberration detecting patterns shown in FIG. 7 can be more closely arranged and are thus unlikely to be affected by non-periodic irregularity. This indicates that the color aberration detecting patterns shown in FIG. 7 is useful.

Further, the photosensitive drum 101 and the conveying belt 103 involve driving and conveying irregularities, respectively, so that for the purpose of avoiding being affected by these irregularities, the interval between the reference and detected colors must be reduced.

In the color aberration detecting patterns shown in FIG. 7, the interval between the reference and detected colors is always 50 dots. On the other hand, in the color aberration detecting patterns shown in FIG. 3, the interval between the Y and Bk is 50×3+35×2=220 dots. This result indicates that the color aberration detecting patterns shown in FIG. 7 are more unlikely to be affected by the driving irregularity.

For the patterns shown in FIG. 3 and comprising combinations of the horizontal and oblique lines, if the color aberration in the scanning direction is to be calculated, the interval between the patterns of the oblique and horizontal lines of the same color must be detected. In the color aberration detecting patterns shown in FIG. 3, the interval between the patterns of the oblique and horizontal lines of the same color is 50×3+35×3+100=355 dots.

On the other hand, for the color aberration detecting patterns shown in FIG. 7, if the color aberration in the scanning direction is to be calculated, the interval between the reference- and detected-color patterns of the same shape may be detected. In the color aberration detecting patterns shown in FIG. 7, the interval between the reference- and detected-color patterns of the same shape is always 50 dots. Thus, even if the color aberration in the scanning direction is to be calculated, the color aberration detecting patterns shown in FIG. 7 are more unlikely to be affected by the driving irregularity. This reduces errors in the detection executed by the sensor 106 which errors are caused by non-periodic irregularity.

As described above, the present invention reduces errors in the detection of the pattern images to enable aberration to be detected accurately. Thus, the aberration between images can be accurately corrected to obtain high-definition images.

The present invention has been described in conjunction with the preferred embodiments. Obviously, however, the present invention is not limited to these embodiments, but is susceptible of various variations or applications without deviating from the scope of the claims.

What is claimed is:

1. An image forming apparatus, comprising:
   a plurality of image forming means each having an image bearing body and write means for forming images of different colors on said image bearing body;
   a moving member on which the images formed on said image bearing bodies by said plurality of image forming means are transferred at respective transfer locations;
   pattern forming means for controlling said plurality of image forming means so as to form a plurality of pattern images inclined with respect to a movement direction of said moving member so that two pattern images of a predetermined reference color are transferred onto said moving member with one pattern image of a different color transferred therebetween;
   pattern detecting means for detecting the plurality of pattern images transferred onto said moving member;
   aberration detecting means for detecting aberration of the one pattern image of the different color with respect to the two pattern images of the reference color on the basis of an output from said pattern detecting means; and
   correction means for correcting the aberration of the one pattern image of the different color on the basis of the aberration detected by said aberration detecting means,
   wherein the plurality of pattern images includes first pattern images having a first angle with respect to the movement direction of said moving member and second pattern images having a second angle with respect to the movement direction of said moving member.

2. An image forming apparatus according to claim 1, wherein said pattern forming means controls said plurality of image forming means so as to form the plurality of pattern images for each of a plurality of different colors.

3. An image forming apparatus according to claim 1, wherein said aberration detecting means detects aberration on the basis of a difference between a timing with which the one pattern image of the different color is detected and timings with which the two pattern images of the reference color located before and after the one pattern image of the different color are detected.

4. An image forming apparatus according to claim 1, wherein said pattern detection means includes a plurality of pattern detecting sensors provided at a position corresponding to an end portion of said moving member, said aberration detecting means detects a plurality of aberrations of the one pattern image of the different color corresponding to an output of said plurality of pattern detecting sensors, and said correction means corrects at least one of an aberration in a main-scanning direction, an aberration in a sub-scanning direction, a scale aberration and an inclination in the plurality of aberrations of the one pattern image of the different color.

5. An image forming apparatus according to claim 1, wherein said pattern forming means forms only pattern images inclined with respect to the movement direction of said moving member.

6. An image forming apparatus according to claim 1, wherein the first pattern images and the second pattern images are symmetric with respect to the movement direction of said moving member.

7. An image forming apparatus, comprising:
   a plurality of image forming means each having an image bearing body and write means for forming images of different colors on said image bearing body;
   a moving member on which the images formed on said image bearing bodies by said plurality of image forming means are transferred at respective transfer locations;
   pattern forming means for controlling said plurality of image forming means so as to form a plurality of pattern images inclined with respect to a movement direction of said moving member so that a pattern image of a predetermined reference color and a pattern image of a different color are alternatively transferred onto said moving member a predetermined number of times;
   pattern detecting means for detecting the plurality of pattern images transferred onto said moving member;
   aberration detecting means for detecting aberration of the pattern image of the different color with respect to the pattern images of the reference color on the basis of an output from said pattern detecting means; and correction means for correcting the aberration of the pattern image of the different color on the basis of the aberration detected by said aberration detecting means, wherein the plurality of pattern images includes first pattern images having a first angle with respect to the movement direction of said moving member and second pattern images having a second angle with respect to the movement direction of said moving member.

8. An image forming apparatus according to claim 7, wherein said pattern forming means controls said plurality of image forming means so as to form the plurality of pattern images while sequentially changing the color of the pattern image of the different color.

9. An image forming apparatus according to claim 7, wherein said pattern forming means controls said plurality of image forming means so as to form the plurality of pattern images for each of a plurality of different colors.

10. An image forming apparatus according to claim 7, wherein said aberration detecting means detects aberration on the basis of a difference between a timing with which the pattern image of the different color is detected and timings with which the pattern images of the reference color located before and after the pattern image of the different color are detected.

11. An image forming apparatus according to claim 7, wherein said pattern detecting means includes a plurality of pattern detecting sensors provided at a position corresponding to an end portion of said moving member, said aberration detecting means detects a plurality of aberrations of the pattern image of the different color corresponding to an output of said plurality of pattern detecting sensors, and said correction means corrects at least one of an aberration in a main-scanning direction, an aberration in a sub-scanning direction, a scale aberration and an inclination in said plurality of aberrations of the pattern image of the different color.

12. An image forming apparatus according to claim 7, wherein said pattern forming means forms only pattern images inclined with respect to the movement direction of said moving member.

13. An image forming apparatus according to claim 7, wherein the first pattern images and the second pattern images are symmetric with respect to the movement direction of said moving member.

14. An image forming apparatus, comprising:

a plurality of image forming means for forming images of different colors with a recording material;

pattern forming means for forming a plurality of line pattern images on an image bearing member by means of said plurality of image forming means, the plurality of line pattern images being inclined with respect to a movement direction of the image bearing member and formed so that two line pattern images of a predetermined reference color are formed on said image bearing member with one line pattern image of a different color transferred therebetween;

pattern detecting means for detecting the line pattern images formed on the image bearing member;

aberration detecting means for detecting aberration of the line pattern image of the different color with respect to the line pattern images of the reference color on the basis of an output from said pattern detecting means; and correction means for correcting the aberration of the image of the different color on the basis of the aberration detected by said aberration detecting means.

15. An image forming apparatus according to claim 14, wherein said pattern forming means controls said plurality of image forming means so as to form plural sets of the line pattern images for the different color.

16. An image forming apparatus according to claim 14, wherein said aberration detecting means detects aberration on the basis of a difference between a timing with which the line pattern image of the different color is detected and timings with which the line pattern images of the reference color located before and after the pattern image of the different color are detected.

17. An image forming apparatus according to claim 14, wherein said pattern detecting means includes a plurality of pattern detecting sensors providing at a position corresponding to an end portion of the image bearing member, said aberration detecting means detects a plurality of aberrations of the line pattern image of the different color corresponding to an output of said plurality of pattern detecting sensors, and correction means corrects at least one of an aberration in a main-scanning direction, an aberration in a sub-scanning direction, a scale aberration and an inclination in the plurality of aberrations of the line pattern image of the different color.

18. An image forming apparatus according to claim 14, wherein said pattern forming means forms only line pattern images inclined with respect to a movement direction of the image bearing member.

19. An image forming apparatus according to claim 14, wherein the plurality of pattern images include first pattern images having a predetermined angle with respect to the movement direction of said image bearing member and second pattern images that are symmetric with the first pattern images with respect to the movement direction of the image bearing member.

20. An image forming apparatus according to claim 14, wherein the plurality of pattern images include first pattern images having a first angle with respect to the movement direction of the image bearing member and second pattern images having a second angle with respect to the movement direction of the image bearing member.

* * * * *